(12) United States Patent
Okada

(10) Patent No.: US 6,268,825 B1
(45) Date of Patent: Jul. 31, 2001

(54) NAVIGATION DEVICE FOR VEHICLE AND PREPARATION OF ROAD SHAPE DATA USED THEREFOR

(75) Inventor: Akio Okada, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/276,499

(22) Filed: Mar. 25, 1999

Related U.S. Application Data

(63) Continuation of application No. PCT/JP97/04295, filed on Nov. 25, 1997.

(30) Foreign Application Priority Data

Nov. 25, 1996 (JP) .................................................. 8-313749

(51) Int. Cl.$^7$ .............................. H04B 7/185; G01S 5/02
(52) U.S. Cl. ...................... 342/357.13; 701/208; 701/212
(58) Field of Search ....................... 342/357.13; 701/208, 701/209, 210, 212

(56) References Cited

U.S. PATENT DOCUMENTS

| | | |
|---|---|---|
| 5,283,575 | 2/1994 | Kao et al. . |
| 5,315,295 | 5/1994 | Fujii . |
| 5,539,397 | 7/1996 | Asanuma et al. . |
| 5,699,255 | 12/1997 | Ellis et al. . |
| 6,029,173 * | 2/2000 | Meek et al. ........................... 707/102 |
| 6,075,559 * | 6/2000 | Harada ................................... 348/148 |
| 6,092,076 * | 7/2000 | McDonough et al. ............... 707/102 |
| 6,112,200 * | 8/2000 | Livshultz et al. ..................... 701/214 |

FOREIGN PATENT DOCUMENTS

| | | |
|---|---|---|
| 0 393 632 | 10/1990 | (EP) . |
| 0514887 | 11/1992 | (EP) . |
| 0537499 | 4/1993 | (EP) . |
| 0738877 | 10/1996 | (EP) . |
| 4-236699 | 8/1992 | (JP) . |
| 5-238405 | 9/1993 | (JP) . |
| 6-201392 | 7/1994 | (JP) . |
| 7-49239 | 2/1995 | (JP) . |
| 7-192194 | 7/1995 | (JP) . |
| 8-194890 | 7/1996 | (JP) . |
| 8-292716 | 11/1996 | (JP) . |
| 8-335298 | 12/1996 | (JP) . |

OTHER PUBLICATIONS

Patent Abstracts of Japan, vol. 016, No. 568 (P–1458), Dec. 9, 1992 & JP 04 219783 A (Sumitomo Electric Ind Ltd), Aug. 10, 1992.

* cited by examiner

Primary Examiner—Theodore M. Blum
(74) Attorney, Agent, or Firm—Pillsbury Winthrop LLP

(57) ABSTRACT

A navigation control ECU (10) gives normal guidance to the driver of a vehicle based on the present location of the vehicle as determined from a D-GPS (12) and map data from a map database (14). A map database detailing device (32) obtains detailed data on the shape of a road from the detected valued of a yaw rate sensor (34), an acceleration sensor (36), and a vehicle speed sensor (30) and the data of the map database (14), and stores the detailed data in a detailed map database (28). A vehicle control ECU (20) evaluates the traveling stability of the vehicle at a curve and controls the deceleration, etc., of the vehicle by utilizing the detailed road shape data in the database (28). In this way, a vehicle navigation device can appropriately show the driver of the vehicle the route and control the traveling controller.

19 Claims, 11 Drawing Sheets

NAVIGATION DEVICE FOR VEHICLE AND PREPARATION OF ROAD SHAPE DATA USED THEREFOR

This is a Continuation of application No. PCT/JP97/04295 filed Nov. 25, 1997.

TECHNICAL FIELD

The present invention relates to a navigation device for vehicles that not only gives route guidance but also controls a traveling controller, and more particularly to preparation of road shape data in a map database used by this device.

BACKGROUND ART

A navigation device that gives route guidance toward a destination is conventionally known and installation of this navigation device in vehicles is increasingly common. Such a navigation device identifies the present location of a vehicle at any time and stores road shape data on the shape of a road. Accordingly, the navigation device can also determine the curvature, etc. of a curve into which a vehicle is about to enter. Hereupon, the driver of the vehicle judges from the present vehicle speed whether or not the vehicle can safely negotiate the curve, and a system that issues an alarm or controls the deceleration of the vehicle has been proposed in case of necessity.

This proposed system uses a two-dimensional map in which the data of the plane shapes (X and Y) of a road is obtained from a topographical map as the road shape data, and the radius of curvature, etc. of a course is calculated using this two-dimensional map. Meanwhile, the lateral acceleration during turning when the vehicle travels on a curve with a radius of curvature R at a vehicle speed V can be estimated by $V^2/R$. Hereupon, the turning safety is evaluated according to this lateral acceleration during turning and the coefficient of friction $\mu$ between the road surface at that time and the tires of the vehicle. Then, the driver can issue an alarm and control the deceleration, etc. according to the result of evaluation.

Thereupon, to estimate the safety of vehicle movement on such a curve, the present location of the vehicle can accurately be identified and a map database with data, such as curvature (1/R), a transverse slope (cant: $\theta$), and a lengthwise slope at each location on a road, are necessary. In other words, the lateral acceleration during turning ay of a vehicle body is given by $$ay(\tau)=(V(\tau))^2/R(\tau)-g \times \sin(\theta(\tau))$$

Where, in consideration of cant $\theta$ of the road, it is assumed that the vehicle speed in the future (after $\tau$ seconds) is V ($\tau$), the radius of curvature at the location is R ($\tau$), and the cant is $\theta(\tau)$. At a sharp curve, to facilitate vehicle traveling, a cant of about up to 10% is frequently added, and accurate lateral acceleration can be forecast only when the addition of this cant is considered. Further, because the lengthwise slope of the road also affects the change of vehicle speed and the allocation of vertical tire load on each wheel, the addition of this cant also affects the evaluation of traveling stability.

However, the map database used in the present navigation system includes no cant data. Although the radius of curvature R and the lengthwise slope can be calculated from the location data and altitude data, the calculated R value includes great errors because data spacing is considerably wide. In other words, in the normal map database, location data is only provided for every map point set on a road at intervals of several 10 to several 100 meters, and it was difficult to accurately calculate the shape of a curve.

To forecast curve traveling stability accurately, the map database must be made more accurate. However, immense cost and man-hour would be required to solve this problem. Further, when preparing the map data at fine pitches, there was a problem that the data processing workload increased owing to the large amount of data required to perform the map display and route calculation using the data.

In the Japanese Patent Laid-Open Publication No. Hei 5-238405, a device that stores places requiring attention where the vehicle traveling became unstable due to the vehicle movement obtained when the vehicle actually traveled on the road is proposed. However, this device neither prepares a detailed map database nor accurately forecasts vehicle movement.

DISCLOSURE OF THE INVENTION

The objects of the present invention are to provide a vehicle navigation device that can accurately forecast vehicle movement using detailed data and can also perform effective processing for route guidance, a road shape data preparation device in the map database used thereof, and its method.

The present invention comprises a self-vehicle location detection means that detects the self-vehicle location, a map database that stores road information, a traveling control system control means that controls the traveling controller of the vehicle based on the self-vehicle location detected by the said self-vehicle location detection means and the road information read from the said map database, and a navigation means that gives guidance regarding the vehicle traveling based on the self-vehicle location detected by the said self-vehicle location detection means and the road information read from the map database, wherein the level of detail of the road information read from the map database by the navigation means is reduced to less than the level of detail of the road information read from the map database by the traveling control system control means.

According to the present invention, the level of detail of the road information to be read can be changed. For example, the level of detail can be changed by independently handling simplified and detailed map databases. In such a configuration, the route guidance uses the road information having the degree of low particularity, for example, the road shape data read from the simplified map database. Accordingly, appropriate route search and map display processing can be performed as usual. Meanwhile, to control the traveling controller, detailed road information, for example, the detailed road shape data read from the detailed map database, is used. Accordingly, the traveling stability of the vehicle can be evaluated with sufficient accuracy.

Further, in the present invention, the map database comprises the simplified map database that stores the road information for every location coordinate at a prescribed pitch and the detailed map database that stores the road information for every location coordinate at a more detailed pitch than the prescribed pitch in this simplified map database, wherein the said traveling control system control means controls the vehicle traveling controller based on the road information stored in the said detailed map database, and the said navigation means gives guidance regarding the vehicle traveling based on the road information stored in the said simplified map database.

Because the simplified map database includes only location data for every map point per, for example, several 10 to several 100 meters, curve can not be identified with sufficient accuracy. The present invention, however, does enable such curves to be identified accurately because it uses road shape data with more detail. Moreover, traveling stability can be more accurately evaluated by storing in the detailed map database data, such as the cant, the radius of curvature, and the lengthwise slope.

The present invention further may comprise a traveling status detection means that detects the traveling status data of a self-vehicle, wherein the said detailed map database can be updated based on the traveling status data obtained by this traveling status detection means and the self-vehicle location obtained by the self-vehicle location detection means.

Because detailed road shape data is obtained according to the vehicle's movement, the map data regarding all the roads of the whole country need not be prepared. Further, because the more detailed road shape data is obtained according to the movement, the detailed map database is easy to prepare.

The present invention relates to media on which a navigation program that gives guidance regarding the aforementioned vehicle traveling by a computer is recorded. Various types of such recording media may be used, such as ROM, RAM, and CD-ROM, and information may be downloaded by communication from such media to the navigation device.

The present invention may also be formed as a map detailing method that details the map database storing the road shape data, wherein a vehicle is made to travel, that detects the vehicle movement in accordance with the vehicle location, and that details the map database based on a comparison between this vehicle movement for every vehicle location and the road shape data of the said map database.

The present invention may comprise traveling status detection means that detects the traveling status of the vehicle, location change calculation means that calculates the change of the location in line with the traveling of the traveling status vehicle detected by the traveling status detection means, correction means that compares the location change obtained by this location change calculation means and the accurate location data according the said location change obtained by another means and corrects the traveling status detected by the traveling status detection means based on this comparison result, and road shape data calculation means that calculates the road shape data based on the corrected traveling status.

As described above, the present invention detects the location change based on the traveling status and corrects the traveling status detection error from the error of the obtained location change. Accordingly, road shape data can be obtained based on accurate traveling status information.

Further, the present invention allows the traveling status detection means to detect the traveling status between the measurement starting point and the measurement end point where the location can be determined accurately, wherein the said correction means corrects the traveling status in accordance with the coordinate displacement in the location change from the measurement starting point to the measurement end point obtained by the location change calculation means.

For example, when a vehicle is stopped, a D-GPS can accurately determine the location in the measurement starting point and the measurement end point from a plurality of location data.

The present invention may also occasionally compare the road shape data obtained by the road shape data preparation means and the road shape data of the existing map database between the said two measurement starting point and end point, and correct the road shape data obtained by the road shape data preparation means according to the comparison result.

The present invention, wherein the road shape data in the existing map database is the data for every point with a prescribed pitch, corresponds the road shape data after correction processing to this point and obtains the detailed road shape data by dividing the section between these corresponding points into plural sections and mapping the road shape data that correspond to the number of divided sections.

Hence, detailed road shape data can be obtained by supplementing the originally-owned map data for navigation with the measured road shape data.

Furthermore, the present invention also encompasses a method of preparing the aforementioned road shape data.

BEST MODE FOR CARRYING OUT THE INVENTION

The embodiments suitable for the present invention are described below based on the drawings.

[First Embodiment]

"Overall Constitution"

Figure 1:
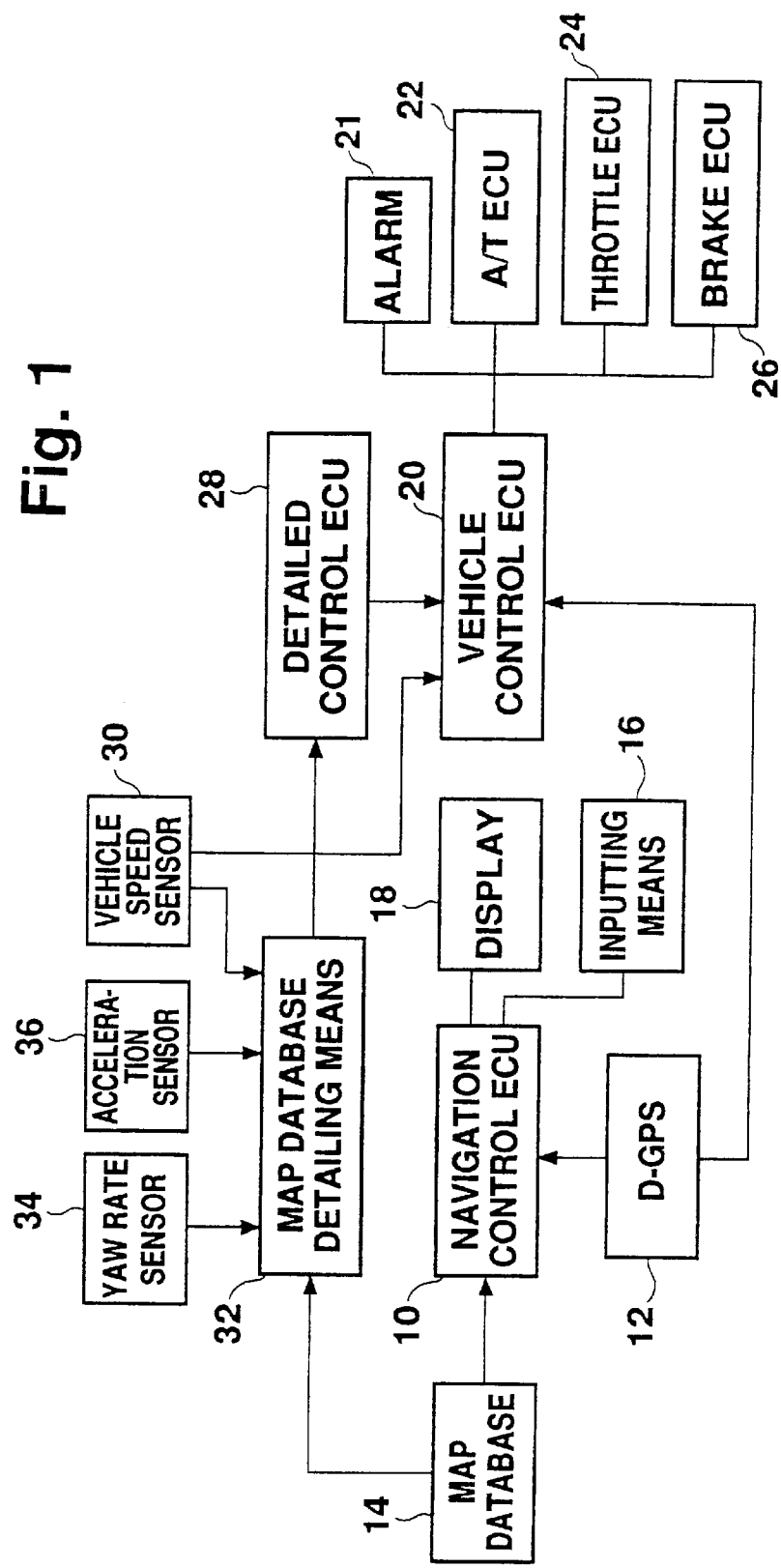
FIG. 1 is a block diagram showing the constitution of a device according to a first embodiment of the present invention.

FIG. 1 is a block diagram showing the overall constitution according to a first embodiment of the present invention. A D-GPS (differential global positioning system) 12 is connected to a navigation control ECU 10 as a self-vehicle location detection means. This D-GPS 12 consists of a GPS that receives radiowaves from a GPS satellite and detects latitude, longitude, and altitude and a device that receives the error information sent by FM multichannel broadcast, and that then detects the location information with higher accuracy by correcting the location information obtained by the GPS according to the error information. For example, while the location information obtained by the GPS contains errors of about 100 meters, the D-GPS 12 detects locations with errors of about 1 meter.

It is preferable to detect locations as accurately as possible by combining various methods, such as the location data obtained from a radio beacon, an optical beacon, etc., the detection of a magnetic marker buried in a road, self-contained navigation that uses an azimuth sensor and traveling distance sensor, and map matching.

A map database 14 is connected to the navigation control ECU 10. This map database 14 includes the map data of the whole country and has data for every map point set on the road at pitches of several 10 to several 100 meters. Further, an input device 16 and a display 18 are connected to the navigation control ECU 10. The input device 16 consists of prescribed keys and a touch panel provided at the front of the display 18 and inputs various data and operating instructions from them.

Next, in accordance with the input of a destination through the input device 16, the navigation control ECU 10 uses the map data of the map database 14 to search for the optimum route from the present location to the destination. In the traveling in which the route to the destination was set, the present location is normally determined from the data from the D-GPS 12, and the map containing the present location is displayed on the display 18 in addition to the present location. This map is displayed using the data read from the map database 14. Moreover, the set route is distinguished on the map and displayed (for example, displayed in a specific color), and at an intersection where guidance is required to turn right or left, the intersection is enlarged and displayed to give route guidance. Route guidance is also output aurally from a speaker (not shown).

The device according to this embodiment has a vehicle control ECU 20, and vehicle control equipment, such as an alarm 21, A/TECU 22, a throttle ECU 24, and a brake ECU 26 is connected to the vehicle control ECU 20. Further, a detailed map database 28 is connected to the vehicle control ECU 20 and the D-GPS 12 and a vehicle speed sensor 30 are also connected to it.

The vehicle control ECU 20 reads from the detailed map database 28 the detailed road shape data for the road ahead on which the vehicle is traveling. Then, based on the detailed road shape data and the self-vehicle speed supplied by the vehicle speed sensor 30, the forthcoming traveling status is estimated and the traveling stability is decided based on the estimation result. If necessary, an alarm is issued by the alarm 21, down-shift is performed by the A/TECU 22, throttle closing is controlled by the throttle ECU 24, and deceleration is controlled by the brake ECU 26.

In other words, the detailed map database 28 stores data, such as locations (X and Y), curvature (1/R), a transverse slope (cant), and a lengthwise slope (inc) for every point at appropriate pitches (for example, 2 to 3 meters) as prescribed pitches. Hereupon, the vehicle control ECU 20 forecasts the forthcoming traveling and evaluates the traveling stability from the road shape data stored in the detailed map database 28, the present location supplied by the D-GPS 12, and the vehicle speed supplied by the vehicle speed sensor 30.

In principle, the future lateral acceleration ay $(\tau)=(V(\tau))^2/R(\tau)-g\times\sin(\theta(\tau))$ is decided for friction coefficient $\mu$ on the road surface. This calculation is sufficiently accurate because it is based on the detailed road shape data. Because the cant $\theta$ is also considered, the accuracy is considerably high. Because the transverse slope is used, the future vehicle speed is also forecast more accurately. In accordance with the lengthwise slope, the load distribution of a wheel can also be considered.

Particularly, this embodiment is provided with the map database 14 and the detailed map database 28. The data of the map database 14 is used for the route search and map display in the navigation control ECU 10. Accordingly, processing is performed efficiently using only necessary data. Meanwhile, to control the traveling controller by the vehicle control ECU 20, detailed road shape data of the detailed map database 28 is used. Accordingly, accurate alarm output and traveling control are performed based on the estimation of lateral acceleration, etc.

Further, the configuration of this embodiment includes a map database detailing means 32. Traveling status detection means, such as a yaw rate sensor 34, an acceleration sensor 36, and the vehicle speed sensor 30 are connected to the map database detailing means 32. The map database detailing means 32 detects the road shape data, such as curvature (1/R), cant, and a lengthwise slope (inc) based on the yaw rate, longitudinal and lateral acceleration of a vehicle body, the vehicle speed, the roll acceleration of a wheel, and the vehicle speed measured during actual traveling. Then, the detected road shape data is associated with the map data from the map database 14 using the present location supplied by the D-GPS 12, and accordingly, the map data of the map database 14 is detailed to obtain the detailed road shape data. Subsequently, this detailed road shape data is supplied to the detailed map database 28. Accordingly, every time the vehicle travels, the detailed road shape data of the detailed map database 28 becomes perfect. Besides, when the vehicle travels on the same road several times, the average of several detailed road shape data may be utilized and the several detailed road shape data may also be rewritten as the latest data. Data gathering may also be stopped.

Hereupon, a special measuring vehicle in which a map database detailing means 32 is installed is prepared, and, in this measuring vehicle, the detailed map database 28 is prepared. The prepared detailed map database 28 may also be installed in a normal vehicle. In such a case, the normal vehicle may only install the prepared detailed map database 28 and need not install the map database detailing means 32. Also, in a vehicle containing the map database detailing means 32, it is preferable that the detailed map database 28 prepared in the measuring vehicle be installed. Accordingly, from the outset the measuring vehicle is provided to some extent with detailed data on a road, and detailed data can be added to the vehicle when traveling on a road without any data.

Further, when traveling on a road for which detailed data has already been provided to perform alarm and traveling control, it is preferable that this effect be displayed on the display 18 and be reported to the driver.

"Preparation of Detailed Map Database"

Next, preparation of the detailed map database 28 by the map database detailing means 32 is described below with reference to FIG. 2.

First, when the measuring vehicle containing various measuring instruments travel on an object course (road) and measure the vehicle speed V, longitudinal acceleration Gx of the vehicle body, lateral acceleration Gy of the vehicle body, yaw rate YR of the vehicle body, and time t (S11), are measured.

At the same time, the vehicle location is measured by the D-GPS 12 (S12) and the vehicle status information and the D-GPS location data is recorded at prescribed sampling intervals (for example, at an interval of 0.01 second) (S13).

Hereupon, the current GPS data is sent every one second. Therefore, a time lag is generated in the detected location data. This time lag is corrected and the X and Y coordinates at Δt second intervals are obtained by interpolation. Subsequently, an appropriate filter processing is applied to the measured value to smoothen the data and reduce errors (S14). The road shape data, such as the vehicle locations (X and Y) at Δt second intervals, curvature (1/R), cant, and a lengthwise slope (inc) (S15) is then calculated. An appropriate Δt may be about 0.2 second.

The road shape data is then calculated by each of the following expressions:

$$1/R = YR/V$$

$$cant = \sin^{-1}((V \cdot YR - Gy)/g)$$

$$inc = \sin^{-1}((Gx - r d\omega/dt)/g)$$

In the above expressions, V is vehicle speed (m/s), YR is yaw rate (rad/s), Gy is vehicle lateral acceleration (m/s$^2$), Gx is vehicle lateral acceleration (m/s$^2$), rdω/dt is wheel acceleration m/s$^2$) (r is tire effective diameter: dynamic load radius (m), dω/dt is angle of rotation acceleration (rad/s$^2$)), and g is gravitational acceleration (9.8 m/s$^2$). Road shape data can be detected with good accuracy by a correction expression in which the roll rigidity and pitch rigidity of a vehicle are considered. Further, for the yaw rate, longitudinal acceleration or lateral acceleration, a measurement method is used or postprocessing is performed so that the zero point cannot drift.

Thus, the detected road shape data is stored at Δt second intervals. At this time, the location data ($X_{GPS}$ and $Y_{GPS}$) obtained by the D-GPS 12 is also stored by making the data correspond. Hence, the road shape data every Δt shown in Table 1 can be obtained.

(Blank)

TABLE 1

ROAD SHAPE DATA PER TIME

| | t | $X_{GPS}$ | $Y_{GPS}$ | 1/R | cant | inc |
|---|---|---|---|---|---|---|
| NODE STARTING POINT | 0 | | | | | |
| | 0.1 | | | | | |
| | 0.2 | | | | | |
| | . | | | | | |
| | . | | | | | |
| | t | | | | | |
| | . | | | | | |
| | . | | | | | |
| | 100 sec | | | | | |

Then, the map point (where there is road shape data in the map database 14) of the passing time of the current map database 14 (S16) is calculated, followed by the passing time of an interpolation point from which the detailed data is to be obtained between these map points (S17). For example, as shown in Table 2, the interpolation point is obtained by dividing the section between the map points by four. In this case, the map point includes shape points having the data of only the X and Y coordinates and nodes having various data to display the shape of a course on the display, and the shape point is reduced where R of the course is small. For example, at a curve of R=about 60 meters, the spacing of the shape point is set to about 20 meters. The number of divisions n so that the pitch between the respective interpolation points can be set to the predetermined value ds (2 to 5 meters) is determined. In other words, when the distance between the map points is V·($t_{i+1} - t_i$), this distance is divided by ds to obtain the following expression.

$$i\ n = V \cdot (t_{i+1} - t_i)/ds$$

From this expression, determine the number of divisions n. For example, when V·($t_{i+1} - t_i$)=20, the number of divisions n=10 assuming ds=2 m and the number of divisions=4 assuming ds=5 m.

TABLE 2

RELATIONSHIPS BETWEEN SHAPE POINTS AND POINT PASSING TIMES

| | No | $X_M$ | $Y_M$ | POINT PASSING TIME |
|---|---|---|---|---|
| NODE | 0 | $X_0$ | $Y_0$ | |
| SHAPE POINT 1 | 1 | $X_1$ | $Y_1$ | |
| SHAPE POINT 2 | 2 | $X_2$ | $Y_2$ | |
| SHAPE POINT i | i | $X_i$ | $Y_i$ | $t_i$ |
| | | | | $t_i + \frac{1}{4}(t_i + 1 - t_i)$ |
| | | | | $t_i + \frac{2}{4}(t_i + 1 - t_i)$ |
| | | | | $t_i + \frac{3}{4}(t_i + 1 - t_i)$ |
| SHAPE POINT 20 | 20 | $X_{20}$ | $Y_{20}$ | |

Figure 3:
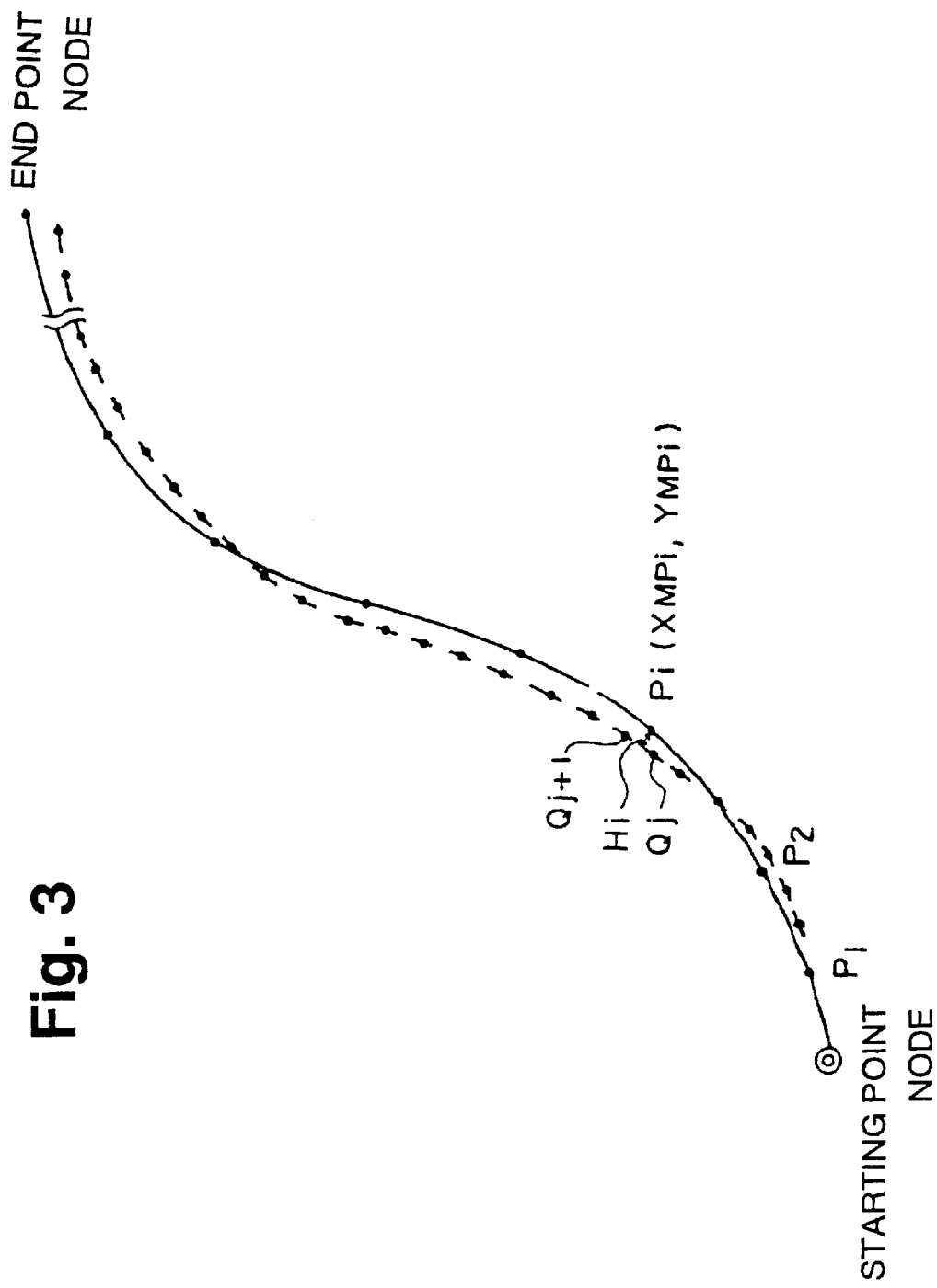
FIG. 3 is a diagram showing the detection of location data.

Hereupon, when considering a section between two nodes, the data in the map database 14 is shown by solid lines, as in FIG. 3. In other words, plural shape points $P_i$ are arranged at prescribed intervals (for example, 20 to 50 meters) between the starting point to the end point. The coordinates of this shape point are represented as ($X_{MPi}$, $Y_{MPi}$). Meanwhile, the location data $Q_j$, at Δt second intervals obtained by the D-GPS 12 is shown with a black circle in a dashed line. These location coordinates are represented as $Q_j(X_{GPSj}, Y_{GPSj})$. Then, to calculate the passing time of each shape point, two points $Q_j$ and $Q_{j+1}$ near to $P_i$ are selected and the passing time at these two points is obtained. When these two passing times were $t_j$ and $t_{j+1}$, the passing time t of the shape point $P_i$ from the location $H_i$ at the foot of a perpendicular that drops onto the straight line connecting the points $Q_j$ and $Q_{j+1}$ from point $P_i$ can be calculated using the following expression:

$$t_j = t_j + (\text{straight line } Q_j H_i / \text{straight line } Q_{j+1} Q_j) \cdot (t_{j+1} - t_j)$$

Next, the obtained interpolation point, the location coordinates ($X_{Mpi}$, $Y_{Mpi}$) of the map point, and the road shape data in the location (S18) are calculated. Therefore, as shown in Table 3, the detailed road shape data also including the interpolation point is obtained. In other words, the coordinates $X_{MP}$, $Y_{MP}$ on the map database 14 for every map point, the passing time t at that point, the values $X_{GPS}$ and $Y_{GPS}$ measured by D-GPS at that time, the passing time $t_{int}$ of the interpolation obtained by dividing it by n, the vehicle location at that time tint, 1/R, cant, slope value, error (length of a perpendicular) at each point $P_i$, and data on the degree of inadequacy regarding a road are obtained as a table. Regarding the degree of inadequacy for driving, locations requiring caution when traveling nearby are picked up from the measured data and stored.

(Blank)

TABLE 3

| POINT | MAP COORDINATES ON PRESENT NAVIGATION | | PASSING TIME AT THAT | VEHICLE LOCATION AT THAT TIME D-GPS MEASURED VALUE | | TIME $t_{int}$ WHEN INTERVALS ARE INTERPOLATED (IN- |
|---|---|---|---|---|---|---|
| NO. | $X_{MP}$ | $Y_{MP}$ | POINT t | $X_{GPS}$ | $Y_{GPS}$ | TERVALS ARE DIVIDED BY n) |
| NODE POINT→ IN PRESENT NAVIGATION | 0 | $X_{MP0}$ | $Y_{MP0}$ | $t_0$ | $X_{GPS0}$ | $Y_{GPS0}$ | $\left.\begin{array}{l} 0 \\ \vdots \\ 1 \\ \vdots \\ j \\ \vdots \\ n \end{array}\right\} \begin{array}{l} t_0 \\ \vdots \\ t_0 + \\ \frac{j}{n}(t_1 - t_0) \\ t_0 + \vdots \\ \frac{n-1}{n}(t_1 - t_0) \end{array}$ |
| SHAPE→ POINT | 1 | $X_{MP1}$ | $Y_{MP1}$ | $t_1$ | | | $\begin{array}{l} 0 \quad t_1 \\ 1 \quad t_1 + \frac{1}{n}(t_2 - t_1) \\ 2 \\ \vdots \\ n \quad t_1 + \frac{n-1}{n}(t_2 - t_1) \end{array}$ |
| SHAPE POINT i | i | | | $t_i$ | | | |
| NEXT NODE | N | $X_{MPN}$ | $Y_{MPN}$ | | | | $t_N$ |

| | POINT NO. | VEHICLE LOCATION, I/R, CANT, SLOPE VALUES WHEN t = $t_{int}$ | | | | | | ERROR LENGTH OF PERPENDICULAR AT POINT Pi | DEGREE OF INADEQUACY FOR DRIVING |
|---|---|---|---|---|---|---|---|---|---|
| | | X COOR- DINATE | Y COOR- DINATE | I/R | CANT | LENGTHWISE SLOPE | OTHERS | | |
| NODE POINT→ IN PRESENT NAVIGATION | 0 | $X_{00}$ $X_{01}$ . . . $X_{0n-1}$ | $Y_{00}$ $Y_{01}$ . . . $Y_{0n-2}$ | $a_{00}$ $a_{01}$ $a_{02}$ . . $a_{0n}$ | $b_{00}$ $b_{01}$ . . . $b_{0n}$ | $c_{00}$ $c_{01}$ . . . $c_{0n}$ | | | |
| SHAPE→ POINT | 1 | $X_{10}$ $X_{11}$ . . . $X_{1n-1}$ | $Y_{00}$ $Y_{11}$ . . . $Y_{1n-1}$ | $a_{10}$ $a_{11}$ . . $a_{1n}$ | $b_{10}$ . . . $b_{1n}$ | $c_{10}$ . . . $c_{1n}$ | | | |
| SHAPE POINT i | i | $X_{i0}$ . . | $Y_{i0}$ . . | $a_{i0}$ . . | $b_{i0}$ . . | $c_{i0}$ . . | | | |
| NEXT NODE | N | $X_{N0}$ | $Y_{N0}$ | $a_{N0}$ | $b_{N0}$ | $c_N$ | | | |

Next, the data and curvature for every conventional map point are checked and corrected, if necessary (S19). Subsequently, the final detailed data is obtained by appropriately thinning out the data, such as straight lines and curves with large R, and store it in the detailed map database 28 (S20). Thus, the data of the map database 14 can be made more detailed according to the actual traveling. Also, when a road is horizontal and/or straight, data preparation may not be necessary.

This configuration comprises the detailed map database 28 in addition to the map database 14. The detailed map database 28 stores the correlation between the map point location of the map database 14 and the location obtained by the D-GPS 12. Accordingly, the displacement of both locations can immediately be evaluated. For example, if an error occurs in the measurement data for some reason, the error can be checked by calculating the error (length of the perpendicular that drops from each shape point $P_i$) from the following expression:

$$\text{Error} = ((X_{MP} - X_{GPSi})^2 + (Y_{MP} - Y_{GPSi})2)^{1/2},$$

and displaying the X-Y coordinates of both map data on the same screen or by calculating and displaying the location error of the corresponding point. Further, the curvature data to be calculated can also be checked in the same manner. Because the operation of preparing the detailed map database and its result and rewriting require utilizing a computer, errors should preferably not be checked during traveling control, but may be checked during parking, vehicle stop, or engine stoppage. Consequently; because operation load does not increase during traveling control, computer processing also becomes faster.

[Second Embodiment]

In the first embodiment described above, it was assumed that the D-GPS 12 could measure the present location of a vehicle at any time. However, a D-GPS signal cannot always be obtained. Particularly in mountainous areas, there are likely to be many areas in which a D-GPS signal cannot be received. A second embodiment of the present invention provides a method of appropriately detailing the map database and its device by a measuring vehicle traveling in an area, such as a mountainous area as mentioned above.

This second embodiment stores the detailed map data by making a measuring vehicle travel on a road from which the detailed map data is to be obtained and detecting the traveling status of the vehicle, and later performs the map detailing processing in a batch processing.

Figure 4:
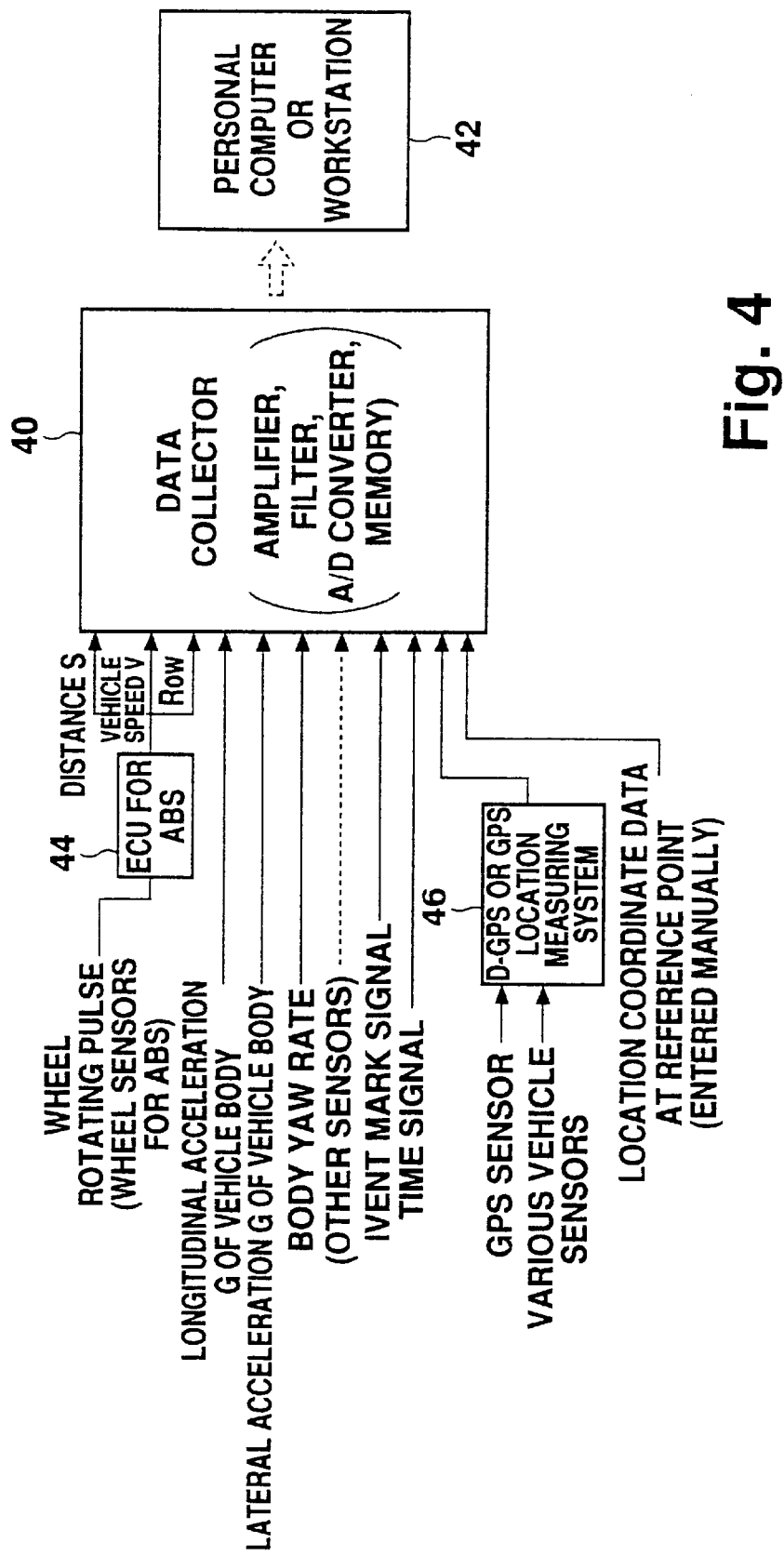
FIG. 4 is a block diagram showing the device constitution according to a second embodiment of the present invention.

FIG. 4 shows a constitution of a device relating to this second embodiment. A data collector 40 stores various traveling data. This data collector 40 basically processes various signals supplied in analog form and converts them to digital signals. Accordingly, this second embodiment includes an amplifier, filter, A/D converter, and memory.

The various data stored in the data collector 40 is supplied to a computer 42. This computer 42 consists of a personal computer and a workstation, and processes the various data supplied and prepares the data for the detailed map database 28. The data of this detailed map database 28 may also be corrected by itself or using both this detailed map database 28 and the detailed map database 14.

Various signals are then input to the data collector 40, and first the distance S, vehicle speed V, and acceleration $R_0 \cdot d\omega/dt$ obtained by processing the rotating pulses of wheels (for example, four wheels) of a vehicle from each wheel sensor (vehicle speed sensor 30) for ABS in the ECU 44 for ABS are input. The longitudinal acceleration (G) of the vehicle body, lateral acceleration (G) of the vehicle body, signals from other sensors, event mark signals generated when the vehicle passes through a prescribed point and the passing is detected, and clock time signals are input to this data collector 40 from an acceleration sensor (acceleration sensor 36) installed in the vehicle. Furthermore, the location signal from a D-GPS or GPS location measuring system (that corresponds to the D-GPS 12) 46 and the manually input location coordinate data in the reference point are also input to the data collector 40. GPS signals and the detection signals for various vehicle sensors are input to the location measuring system and the location is detected accurately only by combining self-contained navigation and map matching with the D-GPS.

Figure 5:
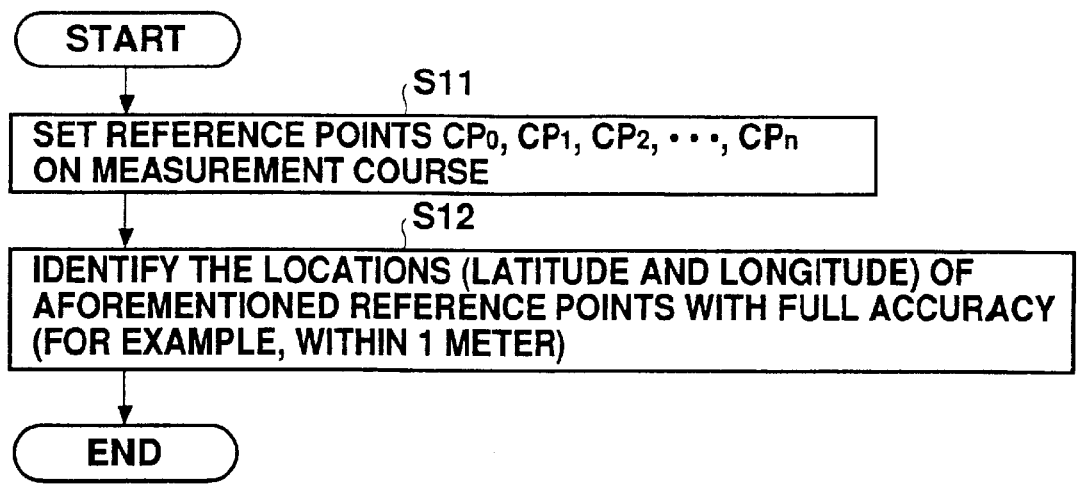
FIG. 5 is a flowchart showing a preliminary process of measurement.
Figure 6:
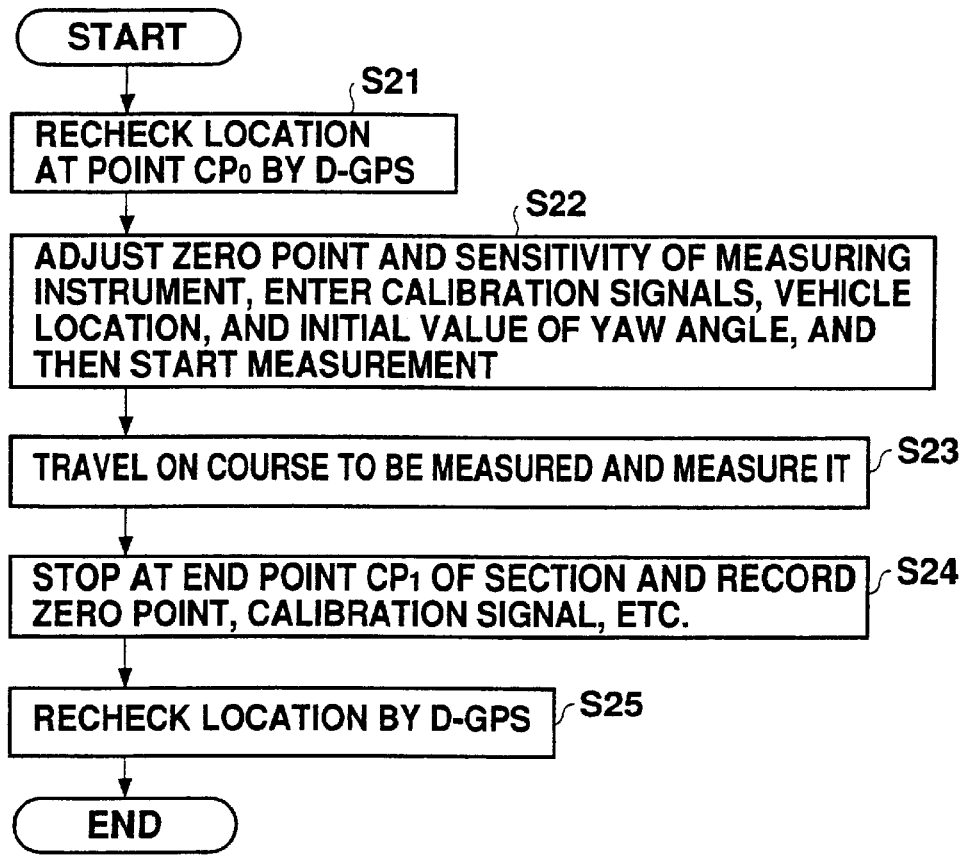
FIG. 6 is a flowchart of the traveling processing.
Figure 7:
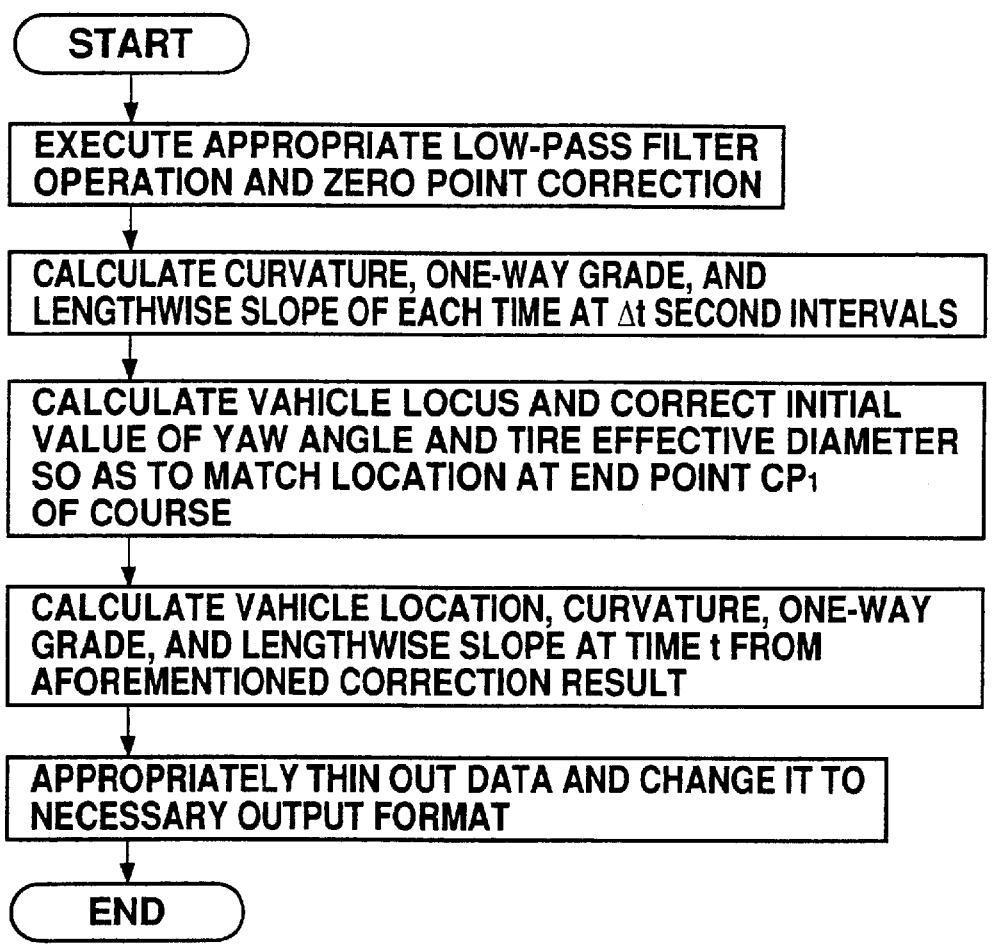
FIG. 7 is a flowchart showing the calculation processing of road shape data.
Figure 8:
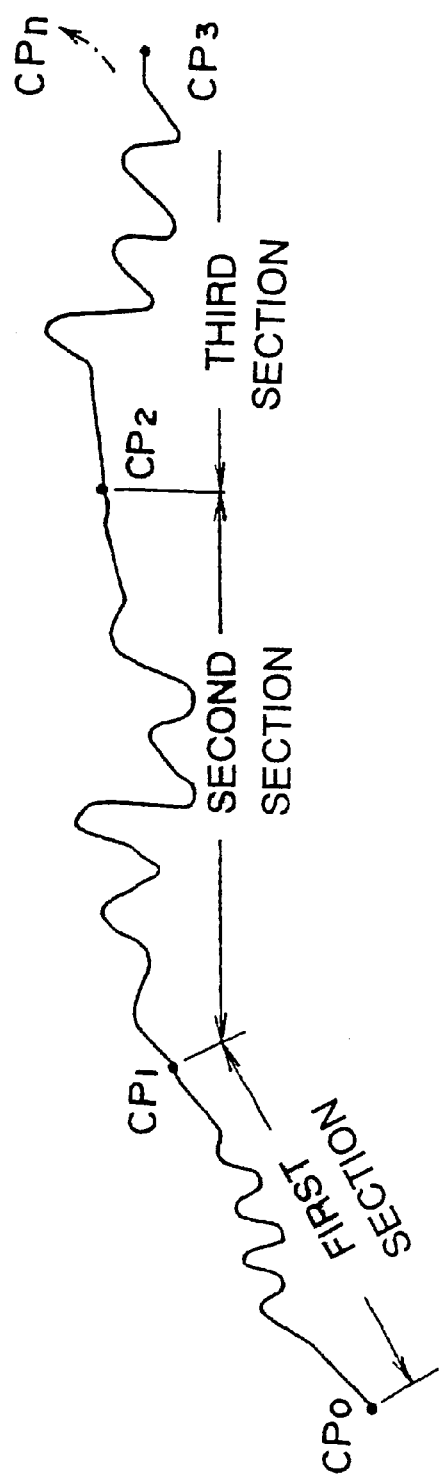
FIG. 8 is a drawing showing an example of a course to be measured.

A processing in which a measuring vehicle is made to travel on a road to be measured and measurement is made in such a system is described based on FIGS. 5 to 7.

First, the advance preparations are described based on FIG. 5. As shown in FIG. 5, reference points $CP_0$, $CP_1$, ... $CP_n$ are set on a measurement course (S11). When, at these reference points, latitude and longitude can be determined with sufficient accuracy (for example, within 1 meter), for example, where plural measurements are made by the D-GPS 12 and these results are statistically processed (for example, the average of longtime measured values) to detect the location, or where the location can be detected accurately from a beacon installed on the road side or a magnetic marker installed on a road, that location shall be a reference location. Assuming that the location is detected by the D-GPS 12, a place where the surroundings are open so that the D-GPS information can be accurately received, and where the vehicle can be safely stopped is selected. The spacing of the reference points may be about 5 to 10 kilometers.

Then, the locations (latitude and longitude) of each reference point are identified with sufficient accuracy (within about 1 meter) by moving the measuring vehicle to the determined reference location (S12). As described above, although it is preferable to accurately measure the location at the reference point prior to an actual measurement, that measurement may be conducted later. If the location cannot be detected with sufficient accuracy at the reference point, the reference point may also be changed.

Thus, when the reference point is determined and the measurement of the location regarding each reference point is terminated as advance preparations, the traveling measurement for detecting the data between the respective reference points is performed. This traveling measurement is essentially the same as in the first embodiment. As shown in FIG. 4, event mark signals, such as wheel rotating pulses (for the front two wheels from the ECU 44 for ABS), vehicle speed signal, longitudinal acceleration of the vehicle body, lateral acceleration of the vehicle body, yaw rate of the vehicle body, time, and measurement start and end are fetched in the data collector 40. These data are retrieved at intervals of interval of 0.1 or 0.2 second.

Hereupon, the measurement between the reference points $CP_0$ and $CP_1$ is described based on FIG. 6. A location is obtained by the D-GPS 12 and rechecked (S21). Then, the zero point and sensitivity of each measuring instrument that performs data measurement is adjusted and calibration signals, vehicle location, and the initial value of the yaw angle (S22) are entered. Then, as the vehicle travels on the course between the reference points $CP_0$ to $CP_1$ measurement is executed (S23). This measurement is stopped when the reference point $CP_1$ that is the end point of the section is reached and the zero point and calibration signal is recorded in the same manner as those of the reference point $CP_0$ (S24). Then, recheck the location in the D-GPS 12 (S25) to terminate measurement. Subsequently, measurement of the next section may be executed.

The road shape data is deduced from the measurement data, as described in FIG. 7. An appropriate low-pass filter and the zero point are corrected and the data is appropriately modified (S31). Thus, collected raw data is obtained. Table 4 shows these relationships.

TABLE 4

| | | | | OUTPUT OF RAW DATA | | | | |
|---|---|---|---|---|---|---|---|---|
| | TIME t | WHEEL SPEED (v = Row) | WHEEL ACCELERATION (Row) | LONGITUDINAL ACCELERATION G OF VEHICLE BODY ($G_X$) | LATERAL ACCELERATION G OF VEHICLE BODY ($G_Y$) | YAW RATE (YR) | BY GPS ← LOCATION SIGNAL ($X_{GPS}$) ($Y_{GPS}$) | RMARKS |
| TRAVELING START AFTER CALIBRATION AT POINT $CP_0$. | 0.0 0.1 0.2 0.3 | | | | | | | ENTER THE LOCATION COORDINATES AT POINT |

TABLE 4-continued

OUTPUT OF RAW DATA

| TIME t | WHEEL SPEED (v = Rω) | WHEEL ACCELER-ATION (Rω) | LONGITUDINAL ACCELERA-TION G OF VEHICLE BODY ($G_X$) | LATERAL ACCELERATION G OF VEHICLE BODY ($G_Y$) | YAW RATE (YR) | BY GPS ← LOCATION SIGNAL ($X_{GPS}$) ($Y_{GPS}$) | RMARKS |
|---|---|---|---|---|---|---|---|
| TERMINATION OF TRAVELING (STOP) CALIBRATION | tcp1 | 0 | 0 | | | | $CP_0$ DURING STOP AT POINT $CP_0$. $X_0 = \cdots$ $Y_0 = \cdots$ ENTER THE LOCATION COORDINATES AT POINT $CP_1$ DURING STOP AT POINT $CP_1$. $X_1 = \cdots$ $Y_1 = \cdots$ |

Thus, the wheel speed (V=R0·ω), wheel acceleration R0·dω/dt), longitudinal acceleration (Gx) of the vehicle body, lateral acceleration (Gy) of the vehicle body, yaw rate (YR), and the location signals ($X_{GPS}$ and $Y_{GPS}$) are obtained at appropriate intervals (0.1 second intervals in this case). Also, plural location coordinates in the stopped state are obtained at points $CP_0$ and $CP_1$. For the wheel speed and wheel acceleration, the data previously processed by the ECU 44 for ABS is used.

Then, the curvature, transverse slope, and lengthwise slope are calculated for each time at Δt second intervals (S32). In other words, considering the zero point of the output measured at point $CP_0$, the data is corrected and the curvature, transverse slope (one-way grade), and lengthwise slope is calculated for each time using expressions (1) to (3).

$$1/R = YR/V \tag{1}$$

$$cant = \sin^{-1}((V \cdot YR - Gy)/g) \tag{2}$$

$$inc = \sin^{-1}((Gx - R_0 \cdot d\omega/dt)/g) \tag{3}$$

Figure 2:
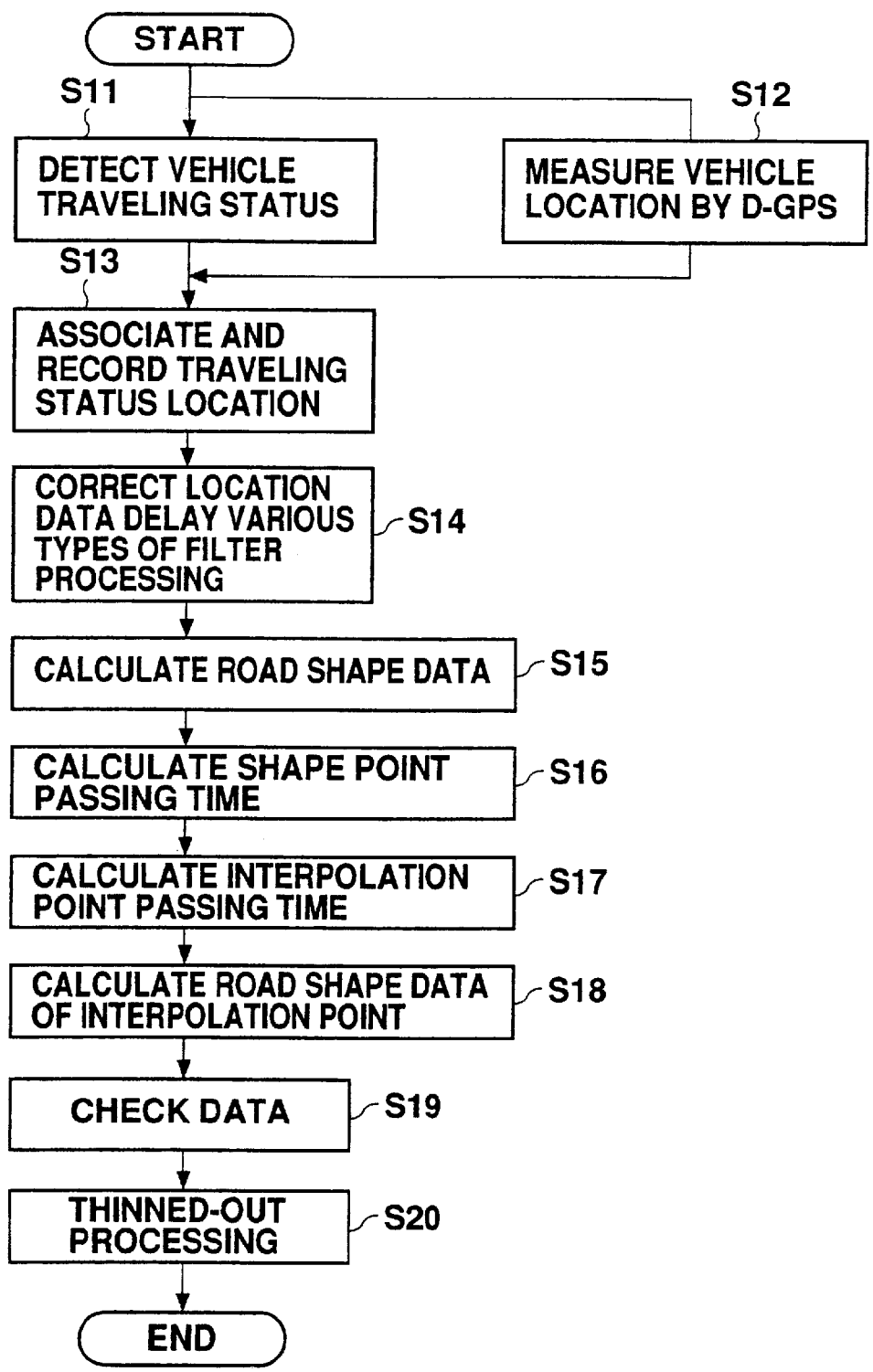
FIG. 2 is a flowchart showing the preparation of a detailed map database.

This data calculation corresponds to S15 of FIG. 2, where the tire dynamic load radius is represented by $R_0$ instead of r. In these measurements, using the vehicle height sensor of each wheel, the angle of the road surface of the body in the roll and pitch directions is measured and converted to the acceleration in the vertical and tangential direction for the road surface. Expressions (2) and (3) further improve the accuracy.

Then, the vehicle locus is calculated and the initial value of the yaw angle and the tire effective diameter (dynamic load radius $R_0$) are corrected so that the locations at end point $CP_1$ of the course match.

Using the aforementioned data, the initial location at point $CP_0$ is calculated, and the location at time $T_1$ when point $CP_1$ is reached is calculated using the initial yaw angle and expressions (4) and (5).

Calculate the angle in the advance direction (direction of the speed vector, and hereinafter referred to as "course angle") θ(t) using the following expression, where [0→t] represents the integral of 0→t regarding t:

$$\theta(t) = \int ds/R = \int (1/R) V \cdot dt \; [0 \to t] + \theta_0$$

Where, ds=vdt.

Further, when 1/R=YR (t)/V (t) and the tire dynamic load radius is correct, the wheel speed v is equal to the vehicle speed V and v=V (t).

From this, the following expression is derived:

$$\theta(t) = \int YR(t)dt \; [0 \to t] + \theta_0 \tag{4}$$

The location coordinates (X (t) and Y (t)) at time t calculated from data behave as, $$X(t) = X_0 + \int \cos \theta(t) \cdot V(t) dt \; [0 \to t] \tag{5}$$

$$Y(t) = X_0 + \int \sin \theta(t) \cdot V(t) dt \; [0 \to t] \tag{6}$$

From these expressions, the coordinates of the location ($CP_1^*$) at time Ti become:

$$X_1^* = X_0 + \int \cos \theta(t) \cdot V(t) dt [0 \to t] \tag{7}$$

$$Y_1^* = X_0 + \int \sin \theta(t) \cdot V(t) dt [0 \to t] \tag{8}$$

Figure 9:
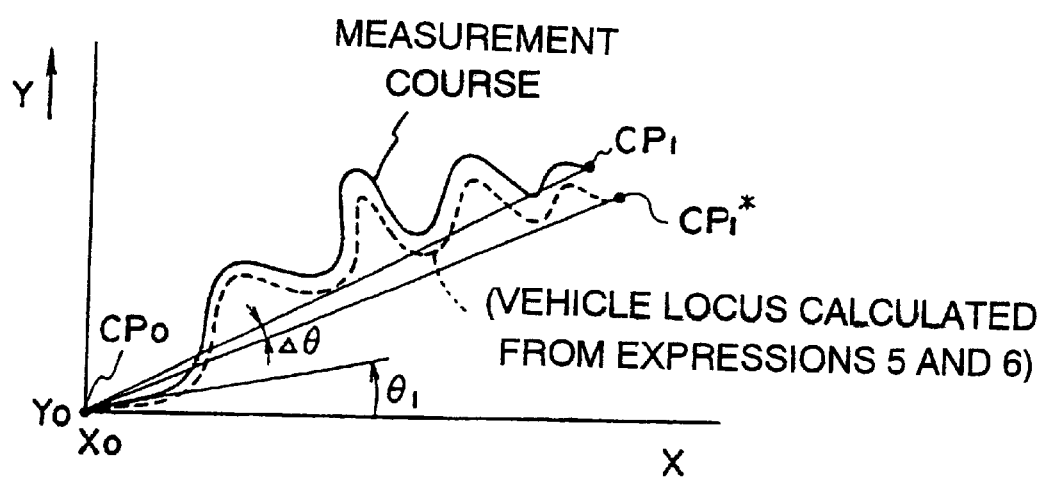
FIG. 9 is a diagram showing a vehicle locus before correction obtained from measurement data.

The values of expressions (7) and (8) obtained from the actual raw data should be the same as the coordinates ($X_1$, $Y_1$) of the originally pre-examined coordinate CP,, but because of imperfect measurement accuracy of the dynamic load radius R0 of a wheel and the initial azimuth angle $\theta_0$, these values may not match. In other words, as shown in FIG. 9, although the measurement course is shown by solid lines, it is assumed that the traveling locus shown by dashed lines is obtained because of imperfect measurement accuracy.

The deviation Δψ of the azimuth angle and the correction coefficient α of the length are obtained using the following expressions.

$$\Delta\psi = \tan^{-1}\{(Y_1-Y_0)/(X_1-X_0)\} - \tan^{-1}\{(Y_1^*-Y_0)/(X_1^*-X_0)\} \tag{9}$$

$$\alpha = \sqrt{[(X_1^*-X_0)^2+(Y_1^*-Y_0)^2]}/\sqrt{[(X_1-X_0)^2+(Y_1-Y_0)^2]} \tag{10}$$

Then, corrections can be made for point $CP_0$ as $\phi 0 + \Delta\psi$ and the dynamic load radius of a wheel as $R\alpha = \alpha R_0$. Accordingly, $CP_1^*$ in FIG. 9 matches $CP_1$.

Once this correction result is obtained, the vehicle location curvature, one-way grade, and lengthwise slope for the time t (S34) can be calculated and a table as shown in Table 5 can be prepared.

(Blank)

TABLE 5

| | | | WHEEL | LONGITUDINAL | LATERAL | |
| | | WHEEL | ACCELER- | ACCELERATION G | ACCELERATION G | YAW |
| | | SPEED | ATION | OF VEHICLE BODY | OF VEHICLE BODY | RATE |
| | TIME t | α Row | α Row | $G_X$ | $G_Y$ | (YR) |
| --- | --- | --- | --- | --- | --- | --- |
| POINT $CP_0$ | 0.0 | 0 | 0 | | | 0 |
| | 0.1 | | | | | |
| | 0.2 | | | | | |
| | 0.3 | | | | | |
| | . | | | | | |
| | . | | | | | |
| POINT $CP_1$ | tcp1 | 0 | 0 | | | |

| | COURSE | VEHICLE LOCATION | | DISTANCE FROM | CURVA- | ONE- | LENGTH- |
| | ANGLE | X COOR- | Y COOR- | STARTING | TURE | WAY | WISE |
| | $(\theta_0 + \Delta\phi)$ | DINATE | DINATE | POINT S | $1/\alpha$ $YR/R_W$ | GRADE | SLOPE |
| --- | --- | --- | --- | --- | --- | --- | --- |
| POINT $CP_0$ | (EXPRES-SION 11) | $X_0$ (EXPRES-SION 12) | $Y_0$ (EXPRES-SION 13) | 0 (EXPRES-SION 14) | (EXPRES-SION 15) | (EXPRES-SION 16) | (EXPRES-SION 17) |
| POINT $CP_1$ | | $X_1$ | $Y_1$ | | | | |

Correction is performed using the following expressions:

$$\theta(t)=\int YR(t)dt[0\to t]+\theta_0+\Delta\psi Y(t)=X_0+\alpha\int \cos\theta(t)\cdot V(t)dt[0\to t] \quad (11)$$

$$Y(t)=Y_0+\alpha\int \sin\theta(t)\cdot V(t)dt[0\to t] \quad (12)$$

$$S(t)=\alpha\int V(t)dt \quad (13)$$

The curvature (1/R), one-way grade (cant), and lengthwise slope (inc) can then be calculated:

$$1/R=(1/\alpha)YR/R_0\omega \quad (15)$$

$$cant=\sin^{-1}((\alpha R_0\omega\cdot YR-Gr)/g) \quad (16)$$

$$inc=\sin^{-1}((Gx-\alpha R_0\cdot d\omega/dt)/g) \quad (17)$$

Thus, when all data are arranged, they can be appropriately thinned out data (for example, at a fixed interval of $\Delta S=2$ meters) and converted to the map for the distance S (S35). It is usually preferable that this data be plotted along with the data of another section on another map in order to check accuracy. Accordingly, based on two reference points and the detected values regarding the traveling locus, the initial values, such as a course angle and dynamic load radius, can be corrected and accurate measured values can be obtained.

In $CP_0$ and $CP_1$, although the maps are matched, the map of intermediate navigation and the traveling locus obtained from expressions (11) and (12) may sometimes not match. For example, when one map is shifted relative to the other, the correction value of the yaw angle at several intermediate points may be changed according to the distance so that the points on both diagrams will match.

"Monitoring Measurement Data"

Figure 10:
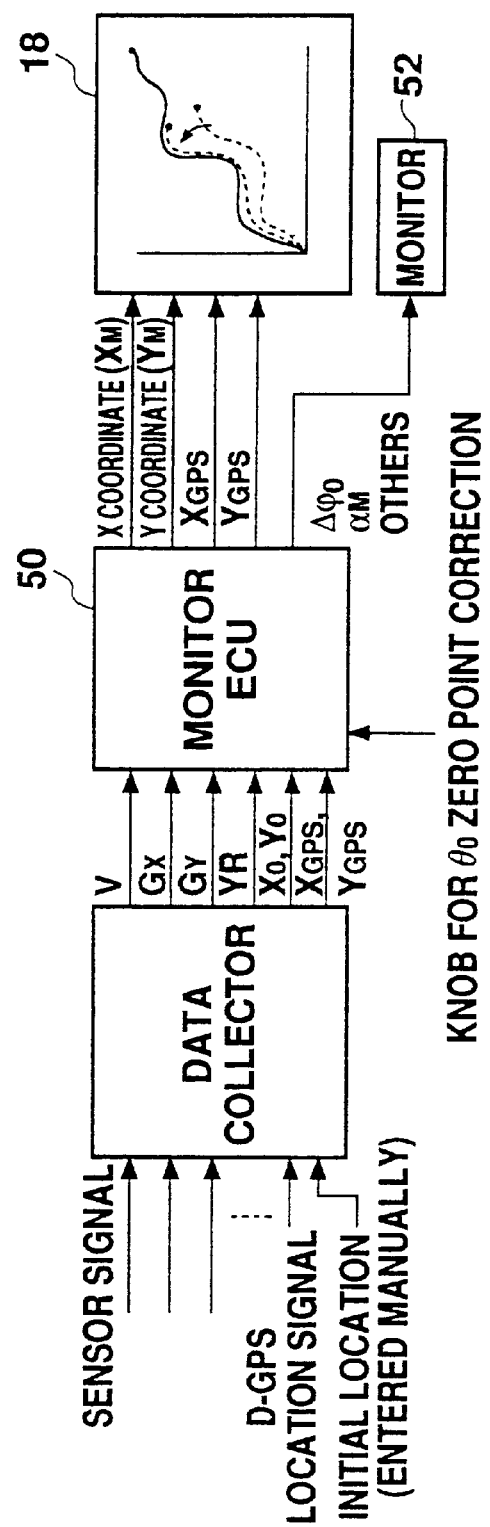
FIG. 10 is a diagram showing the constitution for a measurement data monitor.

In the aforementioned constitution, in principle after the data had been measured between $CP_0$ and $CP_1$, operation was performed in a batch. However, during traveling (during measurement), by performing processing and outputting intermediate data, measurement errors can also be checked. FIG. 10 shows an example of this system constitution.

The output of the data collector 40 is supplied to a monitor ECU 50. This monitor ECU 50 performs the aforementioned calculation using the data supplied by the data collector 40.

The display 18 for navigation and an output monitor 52 are connected to the monitor ECU 50 and the map and the traveling locus obtained by calculation are overlapped and displayed on the display 18 for navigation. The correction values at this stage are digitally displayed on the output value monitor 52. Besides, the monitor ECU 50 is provided with a knob for $\theta_0$ zero point correction and users can use this knob to freely correct the zero point.

In other words, the monitor ECU 50 retrieves data from the data collector 40 at a sampling time of, for example, about 0.1 or 0.2 second. Accordingly, time t, vehicle speed V (t), longitudinal acceleration Gx, lateral acceleration Gy, yaw rate YR, the locations $X_{GPS}$ (t) and $Y_{GPS}$ (t) detected by the GPS, initial locations $X_0$ and $Y_0$, and initial azimuth angle $\theta_0$ are fetched to the monitor ECU 50.

Then, the monitor ECU 50 performs the following operation:

$$\theta_E(t)=\int YR(t)dt+\theta_0[0\to t] \quad (18)$$

$$X_E(t)=X_0+\int \cos\theta(t)\cdot V(t)dt[0\to t] \quad (19)$$

$$Y_E(t)=Y_0+\int \sin\theta(t)\cdot V(t)dt[0\to t] \quad (20)$$

In the above expressions, it is assumed that V (t)=$R0\omega$. For R0, the average of past measurements is used:

$$\psi_{GPS}(t)=\tan^{-1}\{(Y_{GPS}(t)-Y_0)/(X_{GPS}(t)-X_0)\} \quad (21)$$

$$\psi_M(t)=\tan^{-1}\{(Y_E(t)-Y_0)/(X_E(t)-X_0)\} \quad (22)$$

$$\alpha E=\sqrt{[X_E(t)-X_0)^2+(Y_E(t)-Y_0)^2]}/\sqrt{[(X_{GPS}(t)-X_0)^2+(Y_{GPS}(t)-Y_0)^2]} \quad (23)$$

$$\Delta\psi=\psi_M-\psi_{GPS} \quad (24)$$

In the above, $X_{GPS}$ (t) and $Y_{GPS}$ (t) are the outputs of the navigation system and the location data to which processing such as curve matching is applied. The data is represented at an interval of about 0.5 or 1 second.

Next, the locations $X_E$ (t) and $Y_E$ (t) obtained as above are sequentially plotted on the display 18 for navigation and displayed as traveling loci. This display timing is the same as $X_{GPS}$ (t) and $Y_{GPS}$ (t). Further, the difference $\Delta \psi$ of the azimuth angle to the present location of a vehicle from $CP_0$ and $\alpha_E$ (t) are also displayed. Accordingly, the user can judge the degree of coincidence of both locations. For example, when the traveling distance of the vehicle exceeds 500 meters and $\Delta \psi$ is shifted by 5% or more or when a is shifted by 5 degrees or more in the lengthwise direction, error, such as calibration values and zero-point correction, is assumed.

Particularly, for $\Delta \psi$, because the measurement accuracy of initial $\theta_0$ is generally not good, errors easily occur. Thereupon, by manually correcting the correction ($\Delta \theta_0$) of $\theta_0$ and rotating $X_E$ and $Y_E$ along CP0 by $\Delta \theta_0$, both can be overlapped. This prevents the data measurement from being resumed.

Figure 11:
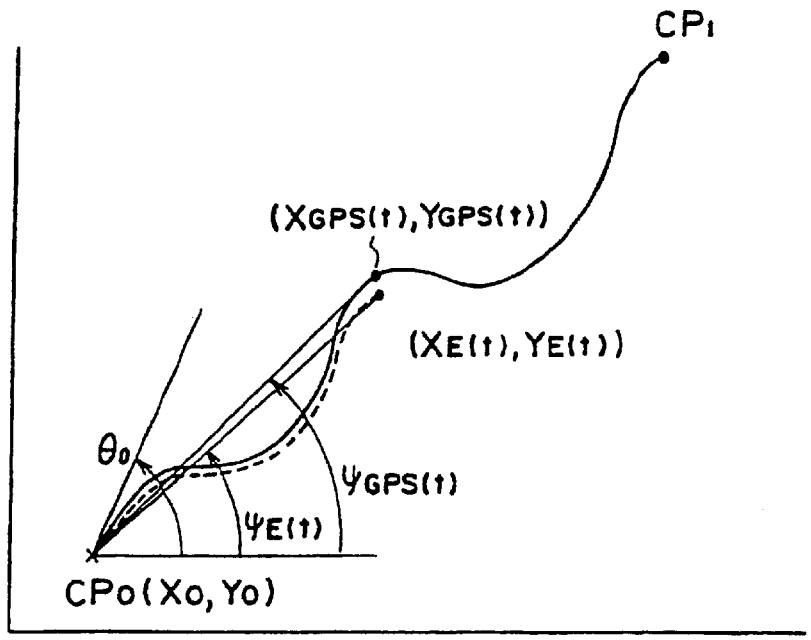
FIG. 11 is a diagram explaining the display on the monitor screen.
Figure 12:
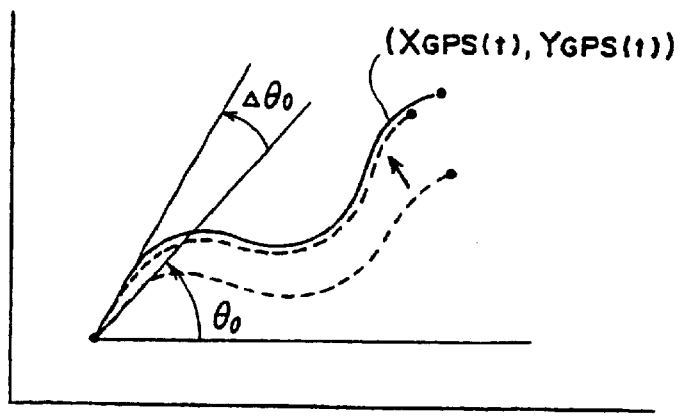
FIG. 12 is a diagram showing the correction of $\theta_0$.

Hereupon, FIG. 11 shows the physical meaning of the display on the monitor screen. As described above, the azimuth angle based on the GPS at the present location is $\psi_{GPS}$ and the azimuth angle obtained from measured values is $\psi_E$, and both differences reach $\Delta \psi$. Besides, $\theta_0$ is the angle of course=azimuth angle in $CP_0$. Then, FIG. 12 shows the correction of $\theta_0$. Thus, by correcting the initial azimuth angle $\theta_0$, the entire traveling locus rotates to the extent of the correction value $\Delta \theta_0$ centered around ($P_0$), and the traveling locus can be overlapped with the road shape data.

Furthermore, also for the lateral acceleration Gy, the lateral acceleration of the vehicle when moving straight ahead (steering wheel set to neutral) exceeds the reference value, the status can be judged as an error. In other words, when the one-way 20 grade of the straight line section is normally about 2%, the status can be judged as an error if it exceeds 5%, for example.

By calculating the one-way grade and lengthwise slope using expressions (2) and (3) above, the status can be judged as an error when the absolute value of this value exceeds 15%, for example. In the normal road design, because the slope is less than 10%, such a decision is possible. For such a decision, appropriate decision may be done by predetermining a standard.

"Preparation of Map Data"

It is preferable to record the data (table of measurement time t, the locations (X (t) and Y (t)) for the traveling distance and other road shape parameters using $CP_0$ as a starting point) of $CP_0$ to $CP_1$ obtained as described above, together with the road shape data in the conventional system. This indicates that a perpendicular drops to the traveling locus obtained from the map point $P_i$ of the navigation map in the same manner as the aforementioned FIG. 3. When this perpendicular is $H_i$, the section between $H_i$ and $H_{i+1}$ is divided by n according to time and the map value at each time is tabulated. Table 3 shows this step. This table is used as the register to select only necessary items and they are assumed to be databases for alarm and control systems. This data may be used by installing it in a vehicle on a medium such as CD-ROM, for example.

"When There is an Area Where D-GPS Can Not Be Used"

Figure 13:
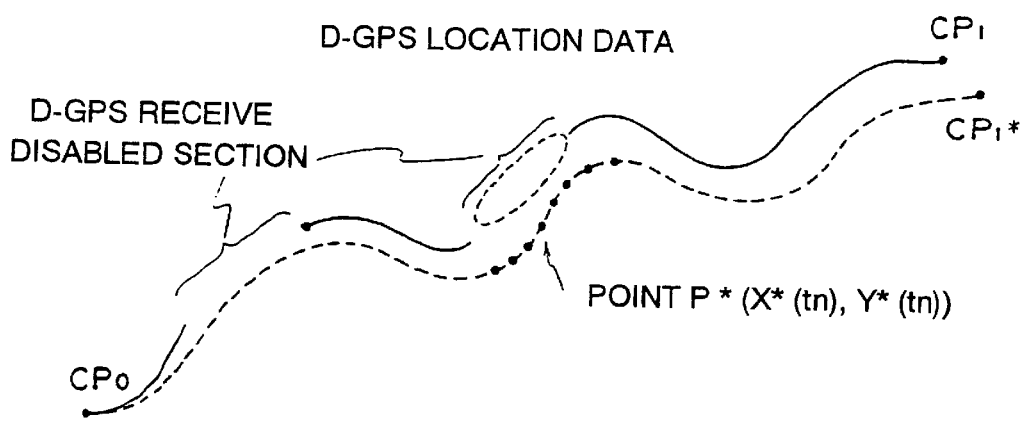
FIG. 13 is a diagram showing a corrective action when there is a D-GPS data receive disabled section.

Measurement on a course where location measurement is partially disabled by the D-GPS 12 is described. FIG. 13 shows the location data measured by the D-GPS 12 during traveling and the location calculated from measurement data using the initial course angle $\theta_0$ at point $CP_0$. The section where the location data was obtained by the D-GPS 12 between $CP_0$ and $CP_1$ is shown by solid lines, and the section where the data was not obtained is not shown. The coordinates of the location P* calculated from the measurement data in the time tn are shown using (X* (tn), Y* (tn)).

Figure 14:
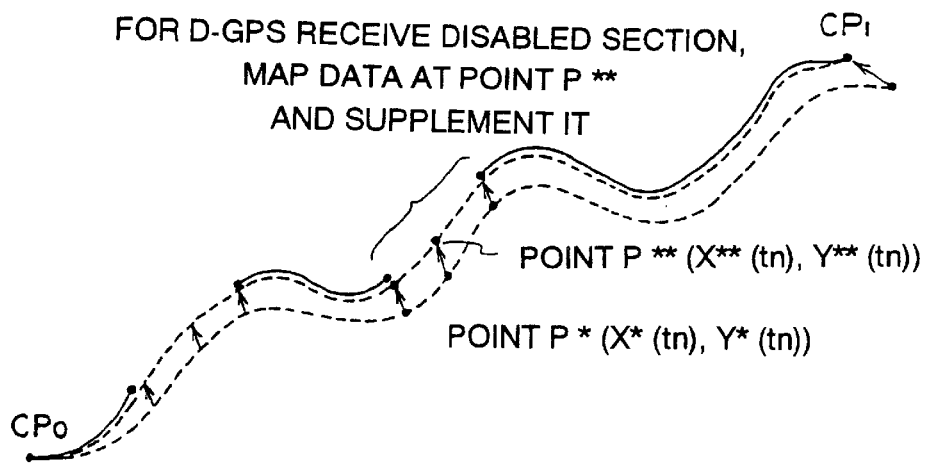
FIG. 14 is a diagram showing a method of supplementing data.

As shown in FIG. 14, $CP_1^*$ rotates and is enlarged (or reduced) centered around point $CP_0$ so that $CP_1^*$ can overlap with $CP_1$.

Accordingly, the point P* (tn) is converted to point  (tn). Using the data of this point P , the data of the section from which the location data cannot be obtained is supplemented by the D-GPS 12.

Specifically, when the section where there is no data of D-GPS 12 is $t=t_{ns}, t_{ns+1}, \ldots, t_{ne}$, the location data of an insufficient part is supplemented by converting P  ($t_{ns-1}$) to P  ($t_{ns+1}$) to P ** ($t_{ns-1}$) to P ($t_{ne+1}$). Then, the location data obtained as time series data and the data of the curvature, one-way grade, and lengthwise slope obtained by the aforementioned method are mapped in the same manner as described above.

When P  is greatly shifted to one side for the data obtained from the D-GPS, because the displacement at the zero point of the yaw rate sensor is assumed, the aforementioned processing may be done by correcting the displacement of the zero point to enter the allowable range and obtain P  again.

"Other Constitutions"

It is assumed that the data processing of the measurement result for the aforementioned mapping is batch-processed after measurement has been completed. However, by using a large processing unit, it is preferable that operations be performed during traveling or stop of a vehicle, and that the result be stored in a recording medium in which the map data for navigation is stored. The average can also be stored by adding it to the existing data.

[Industrial Applicability]

The navigation device relating to the present invention is installed in a vehicle and used in a device that gives route guidance and performs traveling control. The medium in which the navigation program is stored is used for operating a computer installed in the vehicle. The road shape data preparation device and method are used as the map database that is used by the navigation device installed in the vehicle and provides route guidance and performs traveling control.

What is claimed is:

1. A navigation device for a vehicle, comprising:

self-vehicle location detection device that detect the self-vehicle location;

a map database that stores road information;

traveling control system control device that control the traveling controller of a vehicle based on the self-vehicle location detected by the said self-vehicle location detection device and the road information read from the said map database; and navigation device that give guidance regarding the vehicle traveling based on the self-vehicle location detected by the said self-vehicle location detection device and the road information read from the said map database, wherein the level of detail of the road information read from the said map database by the said navigation device is reduced lower than the level of detail of the road information read from the said map database by the said traveling control system control device.

2. The navigation device for the vehicle according to claim 1, wherein said map database comprises a simplified map database that stores the road information for every location coordinate at prescribed pitches; and a detailed map database that stores the road information stored in for every location coordinate at a finer pitch than the pitch prescribed in this simplified map database; wherein the traveling control system control device control the vehicle traveling control system based on the road information detailed map database; and wherein the navigation device give guidance regarding the vehicle traveling based on the road information stored in the said simplified map database.

3. The navigation device for the vehicle according to claim 1, further comprising:

traveling status detecting device that detect the self-vehicle traveling status data;

wherein the detailed map database is updated based on the traveling status data obtained by this traveling status detection device and the self-vehicle location obtained by the self-vehicle location detection device.

4. A medium on which a navigation program that gives guidance regarding vehicle traveling is recorded by a computer, wherein said navigation program allows the computer:

to fetch the self-vehicle location detected by the self-vehicle location detection device;

to read the corresponding road information from a map database based on the detected self-vehicle detection location;

to control the traveling controller of the vehicle based on the self-vehicle location fetched by the said self-vehicle location detection device and the road information read from the said map database; and to give guidance regarding the vehicle traveling based on the self-vehicle location detected by the said self-vehicle location detection device and the road information read from the said map database;

wherein the level of detail of the road information read from the said map database by the said navigation device is reduced lower than the level of detail of the road information read from the said map database by the said traveling control system control device.

5. The medium on which the vehicle navigation program is recorded according to claim 4, wherein the map database comprises:

a simplified map database that stores road information for every location coordinate at prescribed pitches; and a detailed map database that stores road information every location coordinate at a finer pitch than the prescribed pitch in this simplified map database;

wherein the navigation program allows the traveling control system control device to control the vehicle traveling controller based on the road information stored in the said detailed map database; and the navigation device to give guidance regarding the vehicle traveling based on the road information stored in the said simplified map database.

6. The medium on which the vehicle navigation program is recorded according to claim 4, wherein the said navigation program also:

detects the self-vehicle traveling status data by the vehicle status detection device; and updates the detailed map database based on the traveling status data obtained by this traveling status detection device and the self-vehicle location obtained by the self-vehicle location detection device.

7. A map detailing method that details a map database in which road shape data is stored: wherein a vehicle is made to travel and the vehicle movement is detected in accordance with the vehicle location; and the map database is detailed based on the comparison between the movement of this vehicle for every location and the road shape data of the map database.

8. The map detailing method according to claim 7, wherein the said map database stores the road shape data for every location coordinate at a prescribed pitch and updates the prescribed pitch of this road shape data to a finer pitch.

9. The map detailing method according to claim 7, wherein the said map database stores the road shape data for every location coordinate at a prescribed pitch and details the contents of the road shape data in one location coordinate.

10. A road shape data preparation device, comprising:

location change calculation device that calculate the change of the location in line with the traveling of a traveling status vehicle detected by the traveling status detection device;

correction device that compare the location change obtained by the location change calculation device with accurate location data according to the said location change obtained by other device and corrects the traveling status detected by the traveling status detection device based on the comparison result; and road shape data calculation device that calculate the road shape data based on the corrected traveling status.

11. The road shape data preparation device according to claim 10, wherein the traveling status detection device detects the traveling status between the measurement starting point and the measurement end point where the location can be determined accurately and the correcting device corrects the travelling status according to the coordinate displacement in the location change from the said measurement starting point to the measurement end point obtained by the location change calculation device.

12. The road shape data preparation device according to claim 11, wherein road shape data obtained by the road shape data preparation device and road shape data of the existing map database are compared between the two points of the said measuring starting point and measuring end point and the road shape data obtained by the road shape data preparation device in accordance with the comparison result.

13. The road shape data preparation device according to claim 11, wherein the road shape data in the existing map database is the data for every point at a prescribed pitch, and detailed road shape data is obtained by making the road shape data after correction processing correspond to this point, multiply dividing the section between these corresponding points, and mapping the road shape data that corresponds to the number of divisions.

14. The road shape data preparation device according to claim 10, wherein the vehicle location is detected by D-GPS.

15. A road shape data preparation device, wherein traveling status of a vehicle is detected, a change of location is calculated in line with the traveling of the detected traveling status vehicle, the calculated location change and road location data of an existing map database are compared, the detected traveling status is corrected based on this comparison result, and road shape data is calculated based on the corrected traveling status.

16. The road shape data according to claim 15, wherein the traveling status is detected between the measurement starting point and measuring end point where the location can be determined accurately and the drive status detected according to the coordinate displacement in the location change from the said measurement starting point to the measurement end point obtained based on the location change is corrected.

17. The road shape data preparation device according to claim 16, wherein the road shape data obtained by the road shape data preparation device and the road shape data of the existing map database are also occasionally compared between the two points of the said measurement starting point and measurement end point, and the road shape data obtained by the road shape preparation device in accordance with the comparison result is corrected.

18. The road shape data preparation method according to claim 16, wherein the road shape data in the existing map database is the data for every point at a prescribed pitch, and the detailed road shape data is obtained by making the road shape data after correction processing correspond to this point, multiply dividing the section between these corresponding points, and mapping the road shape data that corresponds to the number of divisions.

19. The road shape data preparation device according to claim 15, wherein the vehicle location is detected by the D-GPS.

* * * * *